US008551284B2

(12) United States Patent
Ishibashi et al.

(10) Patent No.: US 8,551,284 B2
(45) Date of Patent: Oct. 8, 2013

(54) POLARIZING FILM, LAMINATED FILM AND LIQUID CRYSTAL DISPLAY

(75) Inventors: Kuniaki Ishibashi, Ibaraki (JP); Hiroyuki Yoshimi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/839,961

(22) Filed: Jul. 20, 2010

(65) Prior Publication Data
US 2010/0282398 A1  Nov. 11, 2010

Related U.S. Application Data

(63) Continuation of application No. 10/566,714, filed as application No. PCT/JP2004/011579 on Aug. 5, 2004, now abandoned.

(30) Foreign Application Priority Data

Aug. 8, 2003  (JP) ................................ 2003-289612
Jul. 23, 2004  (JP) ................................ 2004-215159

(51) Int. Cl.
C09J 5/00         (2006.01)
(52) U.S. Cl.
USPC .......................... 156/324; 156/229; 428/1.31
(58) Field of Classification Search
USPC ....... 428/1.3, 1.31, 411.1, 473.1; 349/96–97, 349/117; 264/1.31, 1.34, 1.7; 156/325–326, 156/324, 229
See application file for complete search history.

(56) References Cited

U.S. PATENT DOCUMENTS

| | | | |
|---|---|---|---|
| 2,996,956 A | 8/1961 | William et al. | |
| 4,643,529 A | 2/1987 | Hosonuma et al. | |
| 4,674,840 A | 6/1987 | Bennett | |
| 5,245,456 A * | 9/1993 | Yoshimi et al. | 349/118 |
| 5,249,071 A * | 9/1993 | Yoshimizu et al. | 349/102 |
| 5,907,378 A | 5/1999 | Abileah et al. | |
| 6,512,561 B1 | 1/2003 | Terashita et al. | |
| 6,628,359 B1 * | 9/2003 | Terashita et al. | 349/120 |
| 6,638,582 B1 | 10/2003 | Uchiyama et al. | |
| 6,912,029 B2 * | 6/2005 | Tanaka | 349/118 |
| 7,088,511 B2 | 8/2006 | Trapani et al. | |
| 7,235,283 B2 | 6/2007 | Adachi et al. | |
| 7,270,855 B2 | 9/2007 | Yamaoka et al. | |
| 7,462,381 B2 * | 12/2008 | Yoshimi et al. | 428/1.1 |
| 7,833,457 B2 * | 11/2010 | Ishibashi et al. | 264/290.2 |
| 7,867,414 B2 * | 1/2011 | Ishibashi et al. | 264/2.7 |
| 2001/0030726 A1 | 10/2001 | Yoshida et al. | |
| 2002/0001700 A1 | 1/2002 | Sanefuji et al. | |
| 2002/0008840 A1 | 1/2002 | Sakamaki et al. | |
| 2002/0075564 A1 * | 6/2002 | Umemoto | 359/488 |
| 2003/0103186 A1 * | 6/2003 | Sasaki et al. | 349/194 |
| 2003/0111764 A1 * | 6/2003 | Nagashima | 264/212 |

FOREIGN PATENT DOCUMENTS

| | | | |
|---|---|---|---|
| JP | 6-148427 A | 5/1994 | |
| JP | 11-133413 A | 5/1999 | |
| JP | 2000-190385 A | 7/2000 | |
| JP | 2001-166134 A | 6/2001 | |
| JP | 2002-022942 A | 1/2002 | |
| JP | 2002-062430 A | 2/2002 | |
| JP | 2002-071957 A | 3/2002 | |
| JP | 2002-127245 A | 5/2002 | |
| JP | 2002-180052 A | 6/2002 | |
| JP | 2002-268068 A | 9/2002 | |
| JP | 2002-296422 A | 10/2002 | |
| JP | 2002-311239 A | 10/2002 | |
| JP | 2003-43257 A | 2/2003 | |
| JP | 2003-00036 A | 5/2003 | |
| JP | 2003-131034 A | 5/2003 | |
| JP | 2003-185838 A | 7/2003 | |
| JP | 2003-207625 A | 7/2003 | |
| JP | 2003-211464 A | 7/2003 | |
| JP | 2003-02378 A | 8/2003 | |
| WO | WO 0109649 A1 * | 2/2001 | |
| WO | WO 0250580 A1 * | 6/2002 | |

OTHER PUBLICATIONS

JPO Website Machine English Translation of JP2003-043257, Matsumoto et al., Feb. 2, 2003.*
Japanese Notification of Reasons for Refusal dated Jan. 15, 2008, issued in corresponding Japanese Patent Application No. 2004-215159.
Korean Office Action dated Apr. 15, 2008, issued in corresponding Korean Patent Application No. 2006-7002482.
Korean Office Action dated Nov. 6, 2008, issued in corresponding Korean Patent Application No. 2006-7002482.
T. Oakberg, "Birefringence Measurement", PEMlabs, Hinds Instruments, 2005.
Decision for Dismissal of Amendment dated Sep. 2, 2009, Appeal Trial No. 2008-8709.
Decision of Refusal dated Mar. 11, 2008, issued in corresponding Japanese Patent Application No. 2004-215159.
Explanation for Evidence dated Nov. 29, 2010.
Interrogation dated Oct. 27, 2008, issued in corresponding Japanese Patent Application No. 2004-215159.
Notification of Reasons for Refusal dated Jan. 18, 2010, issued in corresponding Japanese Patent Application No. 2004-215159.
Notification Reasons for Refusal dated Feb. 22, 2011, issued in corresponding Japanese Patent Application No. 2008-121363.
Notification of Reasons for Refusal dated Nov. 29, 2010, issued in corresponding Japanese Patent Application No. 2008-121363.
Notification of Reasons for Refusal dated Aug. 24, 2009, issued in corresponding Japanese Patent Application No. 2004-215159.
Preparatory Document dated Nov. 29, 2010.
Trial Decision dated Jun. 28, 2010, Appeal Trial No. 2008-8709.

(Continued)

Primary Examiner — John Goff
(74) Attorney, Agent, or Firm — Westerman, Hattori, Daniels & Adrian, LLP

(57) ABSTRACT

The invention provides a polarizing film comprising: a long polymer film; and a dichroic substance, wherein the polarizing film has an absorption axis in the TD direction of the polarizing film.

4 Claims, No Drawings

(56) References Cited

OTHER PUBLICATIONS

Taiwanese Office Action dated Mar. 1, 2011, issued in corresponding Taiwanese Patent Application No. 093123627.

"Preparatory Document (Second)" (Second Brief of the Defendant) dated Apr. 20, 2011 issued for the Second Division of the Japanese Intellectual Property High Court (with respect to counterpart Japanese Patent Application), Case Demanding Cancelation of Trial Decision No. 10235, 2010, 11 pages.

Summary of the Court Decision dated Oct. 4, 2011, Case No. 10235, 2010, 2 pages, The Second Division of the Japanese Intellectual Property High Court (with respect to counterpart Japanese Patent Application).

* cited by examiner

POLARIZING FILM, LAMINATED FILM AND LIQUID CRYSTAL DISPLAY

CROSS-REFERENCE TO RELATED APPLICATIONS

This application is a continuation of U.S. application Ser. No. 10/566,714, filed on Feb. 1, 2006, now abandoned, which is a 371 of International Application No. PCT/JP2004/011579 filed on Aug. 5, 2004 based upon and claims the benefit of priority from the prior Japanese Patent Application No. 2003-289612, filed on Aug. 8, 2003, and prior Japanese Patent Application No. 2004-215159, filed on Jul. 23, 2004 the entire contents of which are incorporated herein by reference.

FIELD OF THE INVENTION

The present invention relates to a polarizing film suitable for the increase in screen size of a liquid crystal display, a laminated film suitable for optically compensating a retardation due to a liquid crystal cell, and a liquid crystal display having these films arranged.

BACKGROUND ART

In IPS mode or VA mode liquid crystal display, polarizers are arranged on front and rear surfaces of a liquid crystal cell so that absorption axes (vibrating directions of light to cause absorption) become perpendicular to each other. A long polarizing film prepared by dyeing a polyvinyl alcohol film or the like with a dichroic substance has been heretofore formed in such a manner that the long film is uniaxially stretched in the lengthwise direction of the long film. In this case, the absorption axis of the polarizing film appears in the lengthwise direction.

In use of the conventional long polarizing film, the long film is cut into film pieces by a predetermined size. The film pieces are used in combination so that the lengthwise direction based on the long film, which is the direction of flow of the film at the time of production of the film (MD direction: Machine Direction), corresponds to a direction perpendicular to the lengthwise direction (TD direction: Transverse Direction). Thus, the orthogonal relation between the absorption axes thereof on the front and rear surfaces of the liquid crystal cell can be achieved. Incidentally, hereinafter, the MD direction is referred to as "lengthwise direction" and the TD direction is referred to as "widthwise direction", simply.

Accordingly, in the aforementioned method, the polarizing film pieces are used to have the relation in which the polarizing film pieces are rotated by 90 degrees on the basis of the absorption axes. Therefore, when polarizing film pieces of the same size are prepared to be applied to the front and rear surfaces of the liquid crystal cell, the width (widthwise length) of the long film is a limit size thereof. In this case, a sufficient widthwise length could not be obtained in the conventional polarizing film since shrinkage occurred in the widthwise direction in a uniaxial stretching step or the like. Then, there was a problem that it was difficult to increase the screen size of liquid crystal display and particularly to obtain a sufficient transverse length. There is a limitation in enlarging of the conventional long film in the widthwise direction because of accuracy in processing into the polarizing film such as the accuracy of orientation, the degree of polarization, etc.

On the other hand, for optical compensation of the retardation due to the liquid crystal cell, particularly for compensation of the viewing angle, the polarizing film and the retardation film are needed so that the slow axis of the retardation film (the direction of the maximum in-plane refractive index) becomes perpendicular to the absorption axis of the polarizing film. In this case, it is advantageous that the polarizing film and the retardation film each provided in the form of rolls can be laminated each other as long films from the point of view of efficiency in production of a laminated film comprising the laminate thereof.

The above can be achieved by stretching a long film in the widthwise direction to form a retardation film having a slow axis in the widthwise direction. In this case, there was a drawback that the direction of the slow axis was apt to vary because of a boing phenomenon that the center portion of the film progressed compared with the case where the long film is stretched in the lengthwise direction to provide a retardation film having a slow axis in the lengthwise direction.

[Reference 1] JP 3-24502
[Reference 2] JP 3-33719

DISCLOSURE OF THE INVENTION

An object of the invention is to provide a polarizing film in which: the transverse size thereof can be arbitrarily set to form the orthogonal relation between absorption axes thereof in front and rear surfaces of a liquid crystal cell; increase in screen size of liquid crystal display, especially a screen having an arbitrary transverse size can be achieved; the polarizing film and a retardation film can be laminated each other as long films, and a laminated film comprising the laminate can be produced efficiently, and to develop a laminated film in which the retardation due to the liquid crystal cell can be highly optically compensated to attain widening of the viewing angle or the like.

That is, the object of the invention can be achieved by the provision of a polarizing film, a retardation film, a laminated film as a laminate of the polarizing film and the retardation film, a liquid crystal display, and a process for producing the polarizing film as follows.

1. A polarizing film comprising: a long polymer film; and a dichroic substance, wherein the polarizing film has an absorption axis in the TD direction of the polarizing film.

2. The polarizing film according to item 1, wherein the length in the MD direction of the polarizing film is not smaller than five times as long as the length in the TD direction of the polarizing film.

3. The polarizing film according to item 1, wherein the polarizing film is produced by stretching the long polymer film in the TD direction.

4. The polarizing film according to item 1, wherein the polarizing film is produced by: stretching the long polymer film in the TD direction; and shrinking the long polymer film in the MD direction.

5. The polarizing film according to item 1, wherein the polarizing film is produced by dyeing the long polymer, which is stretched in the TD direction, with a iodine by using an aqueous solution containing the iodine. 6. The polarizing film according to item 1, wherein the polarizing film is produced by dyeing the long polymer, which is stretched in the TD direction and shrunk in the MD direction, with a iodine by using an aqueous solution containing the iodine.

7. The polarizing film according to item 5, wherein the polarizing film is produced by dyeing the long polymer film with the iodine by applying the aqueous solution containing the iodine onto the long polymer film.

8. A laminated film comprising: a polarizing film according to item 1; and a retardation film having a slow axis in the MD direction, which comprises a long polymer film, wherein the MD direction of the polarizing film corresponds to the MD direction of the retardation film.

9. The laminated film according to item 8, wherein the retardation film comprises a uniaxially stretched film.

10. The laminated film according to item 8, wherein the retardation film comprises an optically uniaxial layer comprising a liquid crystal material.

11. The laminated film according to item 8, wherein the retardation film comprises a birefringent layer comprising a non-liquid crystal material having a birefringence of not lower than 0.005.

12. The laminated film according to item 8, wherein the retardation film is a composite film comprising a birefringent layer provided on a birefringent polymer film.

13. The laminated film according to item 11 or 12, wherein the birefringent layer comprises a solid polymer containing at least one selected from: polyetherketone; polyamide; polyester; polyimide; polyamideimide; and polyesterimide.

14. The laminated film according to item 13, wherein the birefringent layer is a solid polymer comprising polyimide.

15. The laminated film according to item 11 or 12, wherein the birefringent layer has a relationship nx>ny>nz, wherein nx is the maximum in-plane refractive index, ny is an in-plane refractive index in a direction perpendicular to the direction of nx, and nz is a thicknesswise refractive index.

16. A liquid crystal display comprising a polarizing film according to item 1 that is disposed outside of a liquid crystal cell.

17. A liquid crystal display comprising a laminated film according to item 8 that is disposed outside of a liquid crystal cell.

18. A process for producing a polarizing film comprising: unrolling a polymer film successively; stretching the polymer film in the TD direction; and dyeing the stretched film.

19. The process for producing a polarizing film according to item 18; wherein the stretching in the TD direction is carried out by a tenter stretching machine.

BEST MODE FOR CARRYING OUT THE INVENTION

The invention will be described below specifically.

The invention provides: a polarizing film comprising a long polymer film, wherein the film includes a dichroic substance and the polarizing film has an absorption axis in the widthwise direction thereof; a laminated film comprising: the polarizing film; and a retardation film having a slow axis in the lengthwise direction, which comprises a long polymer film, laminated on the polarizing film so that the lengthwise directions of these films correspond each other; a liquid crystal display comprising the polarizing film or the laminated film disposed outside of a liquid crystal; and a process for producing the polarizing film.

The polarizing film according to the invention is a polarizing film comprising a long polymer film, wherein the film includes a dichroic substance and the polarizing film has an absorption axis in the widthwise direction thereof.

The kind of the polymer for forming the film is not particularly limited, and a suitable material such as a homopolymer, a copolymer, or a mixture of two or more kinds of polymers can be used as the polymer. Generally, one kind or two or more kinds selected from hydrophilic macromolecules and polyesters such as polyvinyl alcohol, partially formalized polyvinyl alcohol, ethylene-vinyl alcohol copolymer, and partially saponified ethylene-vinyl acetate copolymer may be used.

The long polymer film preferably has a length not smaller than five times as long as the width of the long polymer film, more preferably from 10 to 100,000 times as long as the width of the long polymer film, still more preferably from 30 to 5000 times as long as the width of the long polymer film. The long polymer film may be provided as a roll of film. The width of the film can be determined suitably in accordance with the purpose of use of the polarizing film to be formed, or the like. Generally, the width is preferably from 5 mm to 5 m, more preferably from 30 cm to 3 m, still more preferably from 50 cm to 2 m.

The polarizing film can be formed by: dyeing the long polymer film with a dichroic substance; and stretching the long polymer film in a widthwise direction. Then an absorption type polarizing film that exhibits characteristic of transmitting linearly polarized light when natural light is incident to the polarizing film can be obtained. The respective steps may be performed simultaneously on the whole of the long film or may be performed partially and repetitively so successively as to be applied on the whole of the long film.

The step of stretching the long film in the widthwise direction aims at providing an absorption axis in the widthwise direction of the long film. In the invention, the polarizing film can be formed by a process according to the background art except that the polarizing film is stretched in the widthwise direction so that an absorption axis is provided in the widthwise direction. Accordingly, one suitable kind or two or more suitable kinds selected from iodine, dichroic dyes, etc. can be, for example, used as the dichroic substance.

Examples of the method used in the dyeing step with the dichroic substance include: a method of introducing and immersing the long polymer film into an aqueous solution containing a dichroic substance; and a method of applying the aqueous solution on the long polymer film. The dyeing step may be performed before or after the step of stretching the polymer film in the widthwise direction or during the stretching step. It is preferable from the point of view of improvement in the degree of polarization based on prevention of dyeing irregularity that the dyeing step is performed after the stretching step.

For example, the step of stretching the long polymer film in the widthwise direction can be performed by a tenter stretching machine. Examples of the stretching method includes: a dry type heating method for heating the polymer film in the atmospheric air to a temperature lower than the melting temperature of the polymer film, especially to a temperature not lower than the glass transition temperature of the polymer film; and a wet type stretching method for stretching the polymer film in an aqueous solution containing boric acid or the like.

It is preferable from the point of view of obtaining a high polarization degree polarizing film highly uniaxially oriented in the widthwise direction that the long polymer film is shrunk in the lengthwise direction (longitudinal shrinking) in addition to stretching in the widthwise direction (transverse stretching). The combination step of transverse stretching and longitudinal shrinking can be performed by a simultaneous or sequential biaxial process using a biaxial stretching machine such as a pantograph type machine or a spindle type machine.

The stretching ratio in the widthwise direction can be determined suitably. Generally, it is preferable from the point of view of orientation accuracy, spreading effect, etc. that the stretching ratio in the widthwise direction is from 1.1 to 20 times as long as the initial width, more preferably from 1.5 to 10 times, still more preferably from 2 to 7 times. Incidentally, when longitudinal shrinking is combined with transverse stretching as described above, it is preferable from the point of view of improvement in the degree of orientation, etc. that the longitudinal shrinking ratio is from 70 to 99% as large as the initial length (100%), more preferably from 75 to 98%, especially preferably from 80 to 97%. In general, the thickness of the polarizing film is preferably from 1 to 200 µm, more preferably from 3 to 150 µm, more preferably from 5 to 80 µm. The thickness of the polarizing film is not limited thereto. Incidentally, as described above, the polarizing film may be crosslinked by additional use of a crosslinking agent such as boric acid.

The polarizing film may have a transparent protective layer(s) provided on a single surface or on both surfaces of the polarizing film if necessary. Each transparent protective layer may be provided for various purposes of reinforcement of the polarizing film, improvement in heat resistance and humidity resistance, improvement in handling property and durability, etc. A suitable transparent substance may be used for forming the transparent protective layer. Especially, a polymer etc. excellent in transparency, mechanical strength, heat stability, moisture sealability, etc. may be used preferably.

Examples of the polymer include: an acetate resin such as triacetyl cellulose; a polyester resin; a polyether-sulfone resin; a polycarbonate resin; a polyamide resin; a polyimide resin; a polyolefin resin; an acrylic resin; and a heat-curable or ultraviolet-curable resin such as an acrylic resin, a urethane resin, an acryl-urethane resin, an epoxy resin, and a silicone resin.

The transparent protective layer can be formed by a suitable method such as a method of applying a polymer or a method of laminating a polymer as a film through an adhesive layer. The adhesive layer is not particularly limited. For example, a layer made of an adhesive agent of an acrylic polymer or a vinyl alcohol polymer or made of an adhesive agent containing boric acid or borax, and an aqueous crosslinking agent of a vinyl alcohol polymer such as glutaraldehyde, melamine or oxalic acid is preferred from the point of view of the laminating process exhibiting peel resistance to humidity and heat.

The thickness of the transparent protective layer can be arbitrarily determined but is generally set to be preferably not larger than 300 µm, more preferably from 1 to 200 µm, more preferably from 5 to 100 µm. Incidentally, when transparent protective layers are provided on both surfaces of the polarizing film, the transparent protective layers may made of different polymers etc. between the front and rear surfaces of the polarizing film.

For example, a hard coating treatment, an anti-reflection treatment, an anti-sticking treatment and other various treatment for diffusion, anti-glare, etc. may be applied to the polarizing film. The hard coating treatment is provided for preventing a surface of a polarizing film from being injured. For example, the hard coating treatment can be made by a method in which a cured coat or film made from a suitable ultraviolet-curable resin such as a silicone resin, a urethane resin, an acrylic resin or an epoxy resin and excellent in hardness, slip characteristic, etc. is applied on a surface of a transparent protective film.

The anti-reflection treatment is provided for preventing external light from being reflected on a surface of the polarizing film. For example, the anti-reflection treatment can be achieved in such a manner that a coherent film such as a coat layer of a fluorine polymer or a multilayer metal deposition film or an anti-reflection film according to the background art is formed suitably.

The anti-sticking treatment is provided for preventing a layer from being stuck closely to an adjacent layer. The anti-glare treatment is provided for preventing visual recognition of light transmitted through the polarizing film from being disturbed by external light reflected on a surface of the polarizing film. For example, the anti-glare treatment can be made in such a suitable manner that a resin coating layer containing transparent fine particles or a fine roughness structure is given to a surface by a suitable method such as embossing, sandblasting or etching to thereby diffuse light reflected on the surface.

For example, transparent fine particles having an average particle size of from 0.5 to 20 µm can be used as the transparent fine particles. Examples of the transparent fine particles include: inorganic fine particles which are made of silica, calcium oxide, alumina, titania, zirconia, tin oxide, indium oxide, cadmium oxide, antimony oxide, etc. and which may be electrically conductive; and crosslinked or non-crosslinked organic fine particles made of a suitable polymer such as polymethyl methacrylate or polyurethane. One kind or two or more kinds of suitable fine particles may be used. The amount of use of the transparent fine particles is generally selected to be preferably from 2 to 70 parts by weight, more preferably from 5 to 50 parts by weight with respect to 100 parts by weight of the transparent resin.

The anti-glare layer may serve as a diffusing layer (having a viewing angle compensating function, etc.) for diffusing light transmitted through the polarizing film to thereby widen the viewing angle. Incidentally, the layers such as the hard coating layer, the anti-reflection layer, the anti-sticking layer, the diffusing layer and the anti-glare layer may be provided as optical layers made of sheets etc. having these layers so as that each optical layer is provided separately from the transparent protective film. Accordingly, the polarizing film may have an optical layer for controlling glaring, scattering, etc. concerned with resolution by using diffusion, scattering, refraction, etc. or may have an optical layer for controlling the viewing angle.

A retardation layer(s) can be laminated on a single surface or both surfaces of the polarizing film to thereby put a laminated film into practice. In this case, a retardation film made of a long polymer film and having a slow axis in the lengthwise direction may be used so that the long polarizing film and the long retardation film are laminated so that the lengthwise directions of the two films correspond to each other. Thus, the laminated film in which the absorption axis of the polarizing film is perpendicular to the slow axis of the retardation film can be formed at excellent production efficiency.

For example, the retardation film having a slow axis in the lengthwise direction can be formed by a roll type longitudinal stretching method in which when a long polymer film is conveyed through a plurality of rolls, circumferential velocities of conveyance rolls are made different to load tension in the lengthwise direction of the film to stretch the film longitudinally uniaxially. In the longitudinal stretching, a retardation film excellent in uniformity of axes of orientation can be obtained by the stretching process having necking suppressed, so that a laminated film useful as a highly accurate viewing angle compensating film or the like can be obtained.

A polymer exhibiting positive birefringence to increase the refractive index in the stretching direction may be preferably used as the polymer for forming the retardation film. Examples of the polymer include: norbornene polymer; polycarbonate; polyether-sulfone; polysulfone; polyolefin; acrylic polymer; cellulose resin; pollyarylate; polystyrene; polyvinyl alcohol; polyvinyl chloride; polyvinylidene chloride; and acetate polymer. The film may be formed by use of one kind or two or more kinds of these polymers.

The length and width of the long polymer film for forming the retardation film can be determined in accordance with those of the long polymer film for forming the polarizing film. Incidentally, a suitable film-forming method such as a casting method or an extrusion method such as a flow-out film-forming method, a roll coating method or a flow coating method can be used for forming the long polymer film. A film formed by a solution film-forming method such as a casting method may be used preferably from the point of view of mass production of polarizing films or retardation films uniform in thickness, orientation distortion, etc. For the formation of the film, various additives such as a stabilizer, a plasticizer, metals, etc. may be mixed if necessary.

In the roll type longitudinal stretching method, the film is preferably stretched while heated in order to reduce variation in the stretching process. A suitable method such as a method using a heat roll, a method of heating the atmosphere or a method using the two methods in combination can be used for heating the film. In this case, the temperature for the stretching process can be set in accordance with the background art. The temperature may be selected to be preferably lower than the melting temperature of the polymer for forming the film, more preferably near to the glass transition temperature, especially preferably not lower than the glass transition temperature.

The retardation film having a slow axis in the lengthwise direction may be a film having an optically uniaxial layer A made of a liquid crystal material instead of the uniaxially stretched film or containing the uniaxially stretched film. A suitable material such as nematic liquid crystal exhibiting liquid crystal characteristic can be used for forming the uniaxial layer A. Especially, a layer of a liquid crystal polymer is preferred from the point of view of durability, etc. For example, the retardation film can be obtained in a suitable form such as the uniaxial layer A applied on a support film or the uniaxial layer A molded into a film.

A suitable film can be used as the support film without any particular limitation. The uniaxial layer A may be integrated with the support film or may be used as a film molding separated from the support film. In the former case where the uniaxial film A is integrated with the support film, the retardation generated in the support film by the stretching process or the like may be used. The latter case where the uniaxial film A is separated from the support film is advantageous to the case where the retardation generated in the support film by the stretching process or the like is inconvenient.

Incidentally, in the former case of the integrated type with the support film, a transparent polymer base material may be preferably used as the support film. Examples of the polymer for forming the base material include: materials listed in the transparent protective layer and the uniaxially stretched retardation film; and liquid crystal polymers.

The retardation film having a slow axis in the lengthwise direction may be a film having a birefringent layer B made of a non-liquid crystal material having a birefringence (Δn) not lower than 0.005. The retardation film can be obtained in a suitable form such as the birefringent layer B applied on a support film or the birefringent layer B molded into a film. In the case where the birefringent layer B is applied on the support film, a film exhibiting birefringence may be used as the support film so as to provide a composite film having the birefringent layer B provided on a birefringent polymer film.

The support film and the film molding of the birefringent layer B can comply with the case where the uniaxial layer A is provided. The birefringent polymer film for forming the composite film is not particularly limited but may comply with the support film or the like. In this case, the birefringence may be generated so that the target retardation characteristic is provided by a suitable biaxial stretching method such as a simultaneous biaxial stretching method using a roll type longitudinal stretching method, a tenter transverse stretching method or a full tenter method or a sequential biaxial stretching method using a roll tenter method.

The non-liquid crystal material for forming the birefringent layer B is not particularly limited either but a suitable material may be used as the non-liquid crystal material. Especially, one kind or two or more kinds selected from polyetherketone, especially, polyaryl ether ketone, polyamide, polyester, polyimide, polyamideimide, polyesterimide, etc. may be used preferably from the point of view of the formability of the birefringent layer having a birefringence (Δn) not lower than 0.005. Incidentally, the birefringence Δn is defined by Δn=(nx+ny)/2−nz in which nx and ny are in-plane refractive indices of the layer, and ny is a thicknesswise refractive index.

A specific example of the polyetherketone, especially, polyaryl ether ketone includes a material having a constitutional repeating unit, for example, represented by the following general formula (1) (JP 2001-49110).

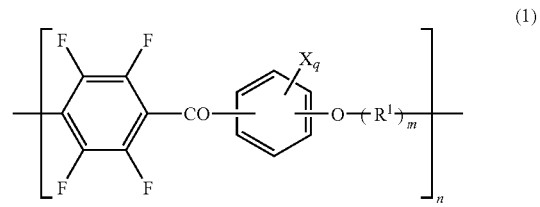

In the general formula (1), X is halogen, an alkyl group or an alkoxy group, and the number q of bonds of X to the benzene ring, that is, the number q of substituents of hydrogen atoms in the position where a p-tetrafluorobenzoylene group and an oxyalkylene group do not bond to each other is an integer of from 0 to 4. Moreover, $R^1$ is a compound (group) represented by the following general formula (2) in which m is 0 or 1, and n expresses the degree of polymerization and is preferably from 2 to 5000, more preferably from 5 to 500.

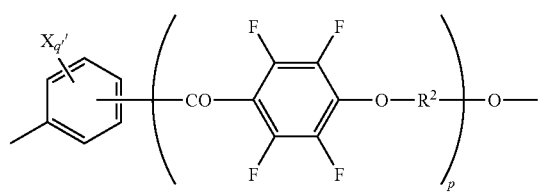

Examples of the halogen as X in the general formula (1) include a fluorine atom, a bromine atom, a chlorine atom, an iodine atom, etc. Especially, a fluorine atom is preferred. An example of the alkyl group includes a straight-chain or branch-chain alkyl group preferably having 1-6 carbon atoms, more preferably having 1-4 carbon atoms, such as a methyl group, an ethyl group, a propyl group, an isopropyl group, a butyl group, etc. Especially, a halogenated alkyl group such as a methyl group, an ethyl group or a trifluoromethyl group is preferred.

Further, an example of the alkoxy group includes a straight-chain or branch-chain alkoxy group preferably having 1-6 carbon atoms, more preferably having 1-4 carbon atoms, such as a methoxy group, an ethoxy group, a propoxy group, an isopropoxy group, a butoxy group, etc. Especially, a halogenated alkoxy group such as a methoxy group, an ethoxy group or a trifluoromethoxy group is preferred. In the above description, the especially preferred X is a fluorine atom.

On the other hand, X' in the group represented by the general formula (2) is halogen, an alkyl group or an alkoxy group, and the number q' of bonds of X' to the benzene ring is an integer of from 0 to 4. The halogen, the alkyl group or the alkoxy group as X' is the same as listed in X.

Preferably, X' is a fluorine atom, a halogenated alkyl group such as a methyl group, an ethyl group or a trifluoromethyl group thereof or a halogenated alkoxy group such as a methoxy group, an ethoxy group or a trifluoromethoxy group thereof. More preferably, X' is a fluorine atom.

Incidentally, in the general formula (1), X and X' may be equal to each other or may be different from each other. In the general formulae (1) and (2), X or X' the number of which is two or more in a molecule on the basis of the fact that q or q' in the general formulae (1) and (2) is not smaller than 2 may be independently equal to the other or may be different from the other.

Especially preferred $R^1$ is a group represented by the following general formula (3).

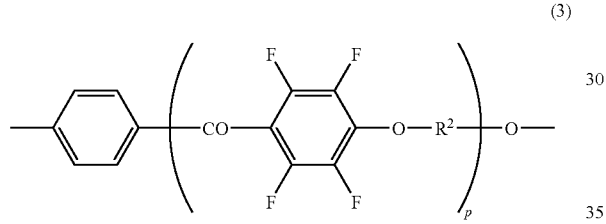

(3)

In the general formulae (2) and (3), $R^2$ is a divalent aromatic group, and P is 0 or 1. Examples of the divalent aromatic group include an (o, m or p-)phenylene group, a naphthalene group, a biphenyl group, an anthracene group, an (o, m or p-)terphenyl group, a phenanthrene group, a dibenzofuran group, a biphenyl ether group, a biphenyl sulfone group, divalent aromatic groups represented by the following formulae, and so on. Incidentally, the divalent aromatic group may be provided in the form in which each hydrogen directly bonded to the aromatic rings of the divalent aromatic group may be replaced by the halogen, the alkyl group or the alkoxy group.

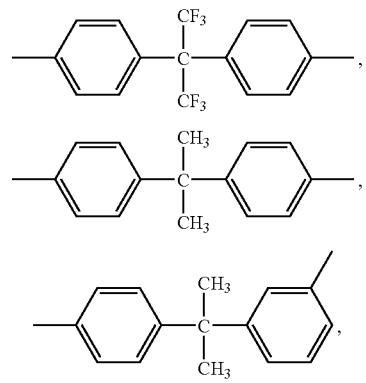

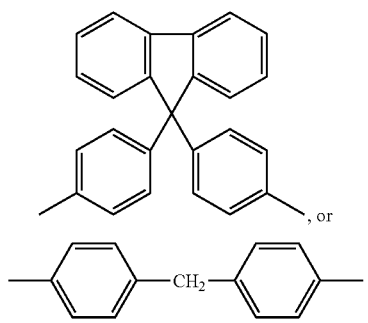

In the above description, preferred examples of the divalent aromatic group ($R^2$) are represented by the following formulae.

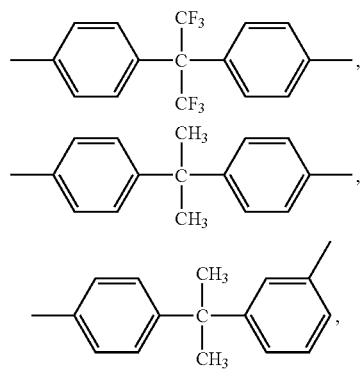

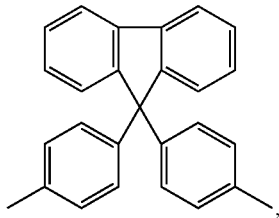

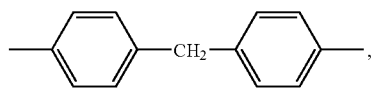

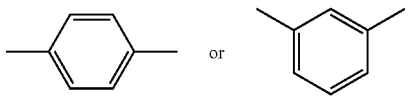

Polyaryl ether ketone represented by the general formula (1) may be formed from the same constitutional repeating units or may have two kinds or three or more kinds of different constitutional repeating units. In the latter case, the respective constitutional repeating units may be provided in the form of blocks or may be provided at random.

Based on the above description, the preferred example of polyaryl ether ketone represented by the general formula (1) is represented by the following general formula (4).

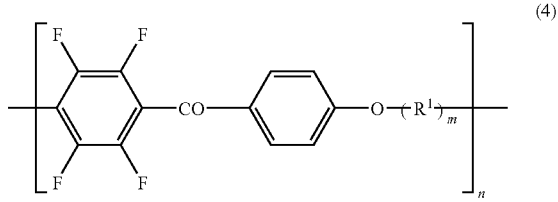

(4)

Preferred polyaryl ether ketone in the case where the terminal group in a molecule is included is represented by the following general formula (5) in accordance with the general formula (1) or represented by the following formula (6) in accordance with the general formula (4). Each of these is provided in the form in which a fluorine atom is bonded to the p-tetrafluorobenzoylene group side in a molecule while a hydrogen atom is bonded to the oxyalkylene group side in the molecule.

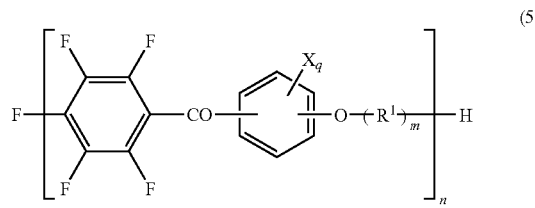

(5)

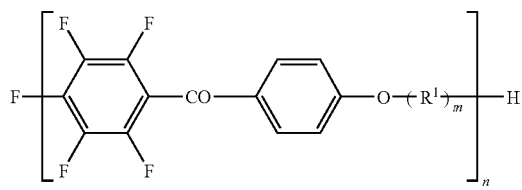

(6)

On the other hand, a specific example of the polyamide or polyester includes a material having a constitutional repeating unit represented by the following general formula (7).

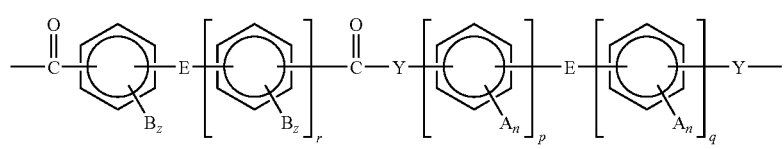

(7)

In the general formula (7), B is halogen, an alkyl group or halogenated alkyl group having 1-3 carbon atoms, a phenyl group replaced by one kind or two or more kinds of these, or a phenyl group not replaced, and z is an integer of from 0 to 3.

E is a covalent bond, an alkenyl group or halogenated alkenyl group having 2 carbon atoms, a $CH_2$ group, a $C(CX_3)_2$ group, a CO group, an O atom, an S atom, an $SO_2$ group, an $Si(R)_2$ group, or an NR group. In the $C(CX_3)_2$ group, X is a hydrogen atom or halogen. In the $Si(R)_2$ group and the NR group, R is an alkyl group or halogenated alkyl group having 1-3 carbon atoms. Incidentally, E is located in a meta or para position with respect to the carbonyl or Y group.

The halogen is a fluorine atom, a chlorine atom, an iodine atom or a bromine atom (hereinafter this rule applies to the general formula (7)).

Moreover, Y is an O atom or an NH group. A is a hydrogen atom, halogen, an alkyl group or halogenated alkyl group having 1-3 carbon atoms, a nitro group, a cyano group, a thioalkyl group having 1-3 carbon atoms, an alkoxy group or halogenated alkoxy group having 1-3 carbon atoms, an aryl group or halogenated aryl group, an alkyl ester group having 1-9 carbon atoms, an aryl ester group or substitutional derivative having 1-12 carbon atoms, or an aryl amide group or substitutional derivative having 1-12 carbon atoms.

Moreover, n is an integer of from 0 to 4, p is an integer of from 0 to 3, q is an integer of from 1 to 3, and r is an integer of from 0 to 3. Preferred polyamide or polyester is a material having a constitutional repeating unit represented by the general formula (8) in which both r and q are equal to 1 and in which at least one of the biphenyl rings is replaced in the 2 and 2' positions.

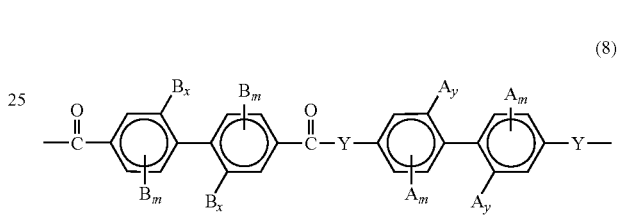

(8)

In the general formula (8), m is an integer of from 0 to 3, preferably 1 or 2, and each of x and y is 0 or 1 but both x and y are not equal to 0 simultaneously. Incidentally, other symbols are synonymous with those in the general formula (7) but E has a para-oriented covalent bond with the carbonyl or Y group.

In the general formulae (7) and (8), when the number of B, E, Y or A is two or more in a molecule, B, E, Y or A may be the same or may be different. Similarly, z, n, m, x or y may be the same or may be different. Incidentally, in this case, B, E, Y, A, z, n, m, x and y can be judged independently.

The polyamide or polyester represented by the general formula (7) may be formed from the same constitutional repeating units or may have two kinds or three or more kinds of different constitutional repeating units. In the latter case, the respective constitutional repeating units may be provided in the form of blocks or may be provided at random.

On the other hand, the specific example of polyimide is a material having one or more constitutional repeating units each containing a condensation polymerization product of 9,9-bis(aminoaryl)fluorine and aromatic tetracarboxylic dianhydride and represented by the following general formula (9).

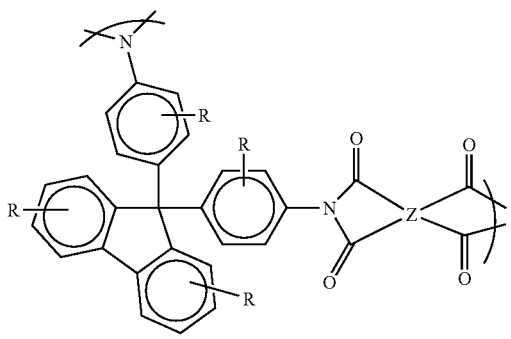
(9)

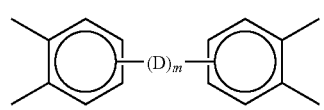
(10)

In the general formula (9), R is a hydrogen atom, halogen, a phenyl group, a phenyl group replaced by an alkyl group having 1-4 halogens or 1-10 carbon atoms, or an alkyl group having 1-10 carbon atoms. The four R can be determined independent of one another, so that replacement can be made in a range of from 0 to 4. The substituents may be preferably the same as described above but may partially contain different materials. Incidentally, the halogen is a fluorine atom, a chlorine atom, an iodine atom or a bromine atom (hereinafter the same rule applies to the general formula (9)).

Z is a three-substitution aromatic group having 6-20 carbon atoms. Preferred Z include a pyromellitic group, a polycyclic aromatic group or substitutional derivative such as a naphthylene group, a fluorenylene group, a benzofluorenylene group or an antrathenylene group, and a group represented by the following general formula (10). Incidentally, examples of the substituents in the substitutional derivative of the polycyclic aromatic group include halogen, and an alkyl group or fluorinated alkyl group having 1-10 carbon atoms.

In the general formula (10), D is a covalent bond, a $C(R^2)_2$ group, a CO group, an O atom, an S atom, an $SO_2$ group, an $Si(C_2H_5)_2$ group, an $N(R^3)_2$ group, or a combination thereof, and m is an integer of from 1 to 10. Incidentally, each of the $R^2$ is independently selected from a hydrogen atom and a $C(R^4)_3$ group. Each of the $R^3$ is independently selected from a hydrogen atom, an alkyl group having about 1-20 carbon atoms and an aryl group having about 6-20 carbon atoms. Each of the $R^4$ is independently selected from a hydrogen atom, a fluorine atom and a chlorine atom.

Examples of polyimide other than the above description include materials having units represented by the following general formulae (11) and (12). Especially, polyimide having the unit represented by the general formula (13) is preferred.

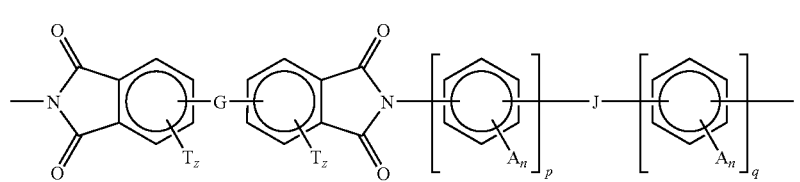
(11)

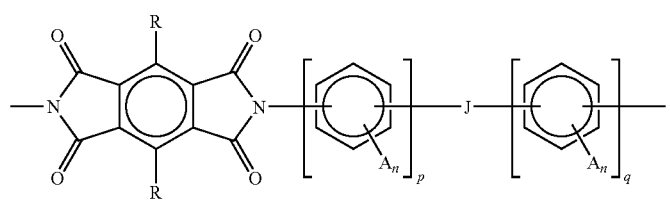
(12)

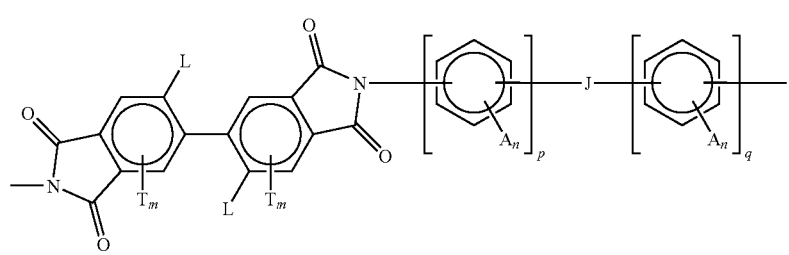
(13)

In the general formulae (11), (12) and (13), each of T and L is halogen, an alkyl group or halogenated alkyl group having 1-3 carbon atoms, a phenyl group replaced by one kind or two or more kinds of these, or a phenyl group not replaced. The halogen is a fluorine atom, a chlorine atom, an iodine atom or a bromine atom (hereinafter this rule applies to the general formulae (11), (12) and (13)), and z is an integer of from 0 to 3.

Moreover, each of G and J is a covalent bond or junctional bond, a $CH_2$ group, a $C(CX_3)_2$ group, a CO group, an O atom, an S atom, an $SO_2$ group, an $Si(C_2H_5)_2$ group, or an $N(CH_3)$ group. In the $C(CX_3)_2$ group, X is a hydrogen atom or halogen (hereinafter this rule applies to the general formulae (11), (12) and (13)).

A is a hydrogen atom, halogen, an alkyl group or halogenated alkyl group, a nitro group, a cyano group, a thioalkyl group, an alkoxy group or halogenated alkyl group, an aryl group or halogenated aryl group, or an alkyl ester group or substitutional derivative.

R is a hydrogen atom, halogen, a phenyl group or substitutional phenyl group such as phenyl halide, or an alkyl group or substitutional alkyl group such as alkyl halide, n is an integer of from 0 to 4, p is an integer of from 0 to 3, and q is an integer of from 1 to 3.

Incidentally, in the case where a plurality of T, A, R or L are provided independently in a molecule in the general formulae (11), (12) and (13), the plurality of T, A, R or L may be the same or may be different. Similarly, a plurality of z, n or m may be the same or may be different. Incidentally, in this case, T, A, R, L, z, n and m are judged independent of one another.

The polyimide represented by the general formula (9), (11), (12) or (13) may be formed from the same constitutional repeating units or may have two kinds or three or more kinds of different constitutional repeating units. The different constitutional repeating units may be formed by copolymerization of one kind or two or more kinds selected from acid dianhydride or/and diamine other than the above description. Aromatic diamine is especially preferred as the diamine. In the latter case where different constitutional repeating units are provided, the respective constitutional repeating units may be provided in the form of blocks or may be provided at random.

Examples of the acid dianhydride for forming the different constitutional repeating units include pyromellitic dianhydride, 3,6-diphenylpyromellitic dianhydride, 3,6-bis(trifluoromethyl)pyromellitic dianhydride, 3,6-dibromopyromellitic dianhydride, 3,6-dichloropyromellitic dianhydride, 3,3',4,4'-benzophenonetetracarboxylic dianhydride, 2,3,3',4'-benzophenonetetracarboxylic dianhydride, 2,2',3,3'-benzophenonetetracarboxylic dianhydride, 3,3',4,4'-biphenylcarboxylic dianhydride, and bis(2,3-dicarbophenyl)methane dianhydride.

Examples of the acid dianhydride further include bis(2,5,6-trifluoro-3,4-dicarboxyphenyl)methane dianhydride, 2,2-bis(3,4-dicarboxyphenyl)-1,1,3,3-hexafluoropropane dianhydride, bis(3,4-dicarboxyphenyl)ether dianhydride (4,4'-oxydiphthalic anhydride), bis(3,4-dicarboxyphenyl)sulfone diamhydride(3,3',4,4'-diphenylsulfonetetracarboxylic anhydride), and 4,4'-[4,4'-isopropylidene-di(p-phenyleneoxy)]bis(phthalic anhydride).

Examples of the acid dianhydride further include N,N-(3,4-dicarboxyphenyl)-N-methylamine dianhydride, bis(3,4-dicarboxyphenyl)diethylsilane dianhydride, naphthalene tetracarboxylic dianhydride such as 2,3,6,7-naphthalenetetracarboxylic dianhydride and 1,2,5,6-naphthalenetetracarboxilic dianhydride, 2,6-dicholo-naphthalene-1,4,5,8-tetracarboxylic dianhydride, and heterocyclic aromatic tetracarboxylic dianhydride such as thiophene-2,3,4,5-tetracarboxylic dianhydride, pyrazine-2,3,5,6-tetracarboxylic dianhydride and pyridine-2,3,5,6-tetracarboxylic dianhydride.

The acid dianhydride to be preferably used is 2,2'-substitutional dianhyride such as 2,2'-dibromo-4,4',5,5'-biphenyltetracarboxylic dianhydride, 2,2'-dichloro-4,4',5,5'-biphenyltetracarboxylic dianhydride, and 2,2'-trihalo-substitutional dianhydride. Especially, 2,2-bis(trifluoromethyl)-4,4',5,5'-biphenyltetracarboxylic dianhydride is preferred.

On the other hand, examples of the diamine for forming the different constitutional repeating units include: benzene diamine such as (o, m or p-)phenylene diamine, 2,4-diaminotoluene, 1,4-diamino-2-methoxybenzene, 1,4-diamino-2-phenylbenzene, and 1,3-diamino-4-chlorobenzebe; 4,4'-diaminobiphenyl; 4,4'-diaminophenylmethane; 2,2-bis(4-aminophenyl)propane; 2,2-bis(4-aminophenyl)-1,1,1,3,3,3-hexafluoropropane; 4,4-diaminodiphenyl ether; 3,4'-diaminodiphenyl ether; 1,3-bis(3-aminophenoxy)benzene; 1,3-bis(4-aminophenoxy)benzene; and 1,4-bis(4-aminophenoxy)benzene.

Examples of the diamine further include: 4,4'-bis(4-aminophenoxy)biphenyl; 4,4'-bis(3-aminophenoxy)biphenyl; 2,2-bis(4-[4-aminophenoxy)phenyl]propane; 2,2-bis[4-(4-aminophenoxy)phenyl]-1,1,1,3,3,3-hexafluoropropane; 4,4'-diaminodiphenylthio ether; 4,4'-diaminodiphenyl sulfone; 2,2'-diaminobenzophenone; 3,3'-diaminobenzophenone; naphthalene diamine such as 1,8-diaminonaphthalene, and 1,5-diaminonaphthalene; and heterocyclic aromatic diamine such as 2,6-diaminopyridine, 2,4-diaminopyridine, and 2,4-diamino-S-triazine.

An example of the polyimide to be preferably used is heat-resistant solvent-soluble polyimide prepared by use of aromatic acid dianhydride such as 2,2'-bis(3,4-dicarboxyphenyl)hexafluoropropane dianhydride, 4,4'-bis(3,4-dicarboxyphenyl)-2,2-diphenylpropane dianhydride, naphthalenetetracarboxylic anhydride, and bis(3,4-dicarboxyphenyl)sulfone dianhydride.

Another example of the polyimide to be preferably used is heat-resistant solvent-soluble polyimide prepared by use of aromatic diamine such as 4,4-(9-fluorenylidene)-dianiline, 2,2'-bis(trifluoromethyl)-4,4'-diaminobiphenyl, 3,3'-dichloro-4,4'-diaminodiphenylmethane, 2,2'-dichloro-4,4'-diaminobiphenyl, 2,2',5',5'-tetrachlorobenzidine, 2,2-bis(4-aminophenoxyphenyl)propane, 2,2-bis(4-aminophenoxyphenyl)hexafluoropropane, 1,4-bis(4-aminophenoxy)benzene, 1,3-bis(4-aminophenoxy)benzene, and 1,3-bis(3-aminophenoxy)benzene, as the diamine.

On the other hand, the polyamideimide or polyesterimide is not particularly limited but one kind or two or more kinds of suitable polyamideimide or polyesterimide may be used. Especially, polyamideimide described in JP 61-162512, polyesterimide described in JP 64-38472 etc. may be used preferably.

The molecular weight of the polymer for forming the birefringent layer B is not particularly limited but it is preferable that the polymer exhibits a solid state at room temperature and is soluble in a solvent. Especially, the weight-average molecular weight is preferably from 10,000 to 1,000,000, more preferably from 20,000 to 500,000, especially preferably from 50,000 to 200,000 from the point of view of film strength, prevention of cracking caused by stretching and shrinking, distortion, etc. in the form of a film, solubility (anti-gelation) to the solvent, and so on. Incidentally, the weight-average molecular weight is a value measured by a gel permeation chromatography (GPC) in the condition that dimethylformamide is used as a solvent is used while polyethylene oxide is used as a standard sample.

A solid polymer of polyaryl ether ketone, polyamide, polyester, polyimide, polyamideimide or polyesterimide as described above may be used singly or two or more kinds of these materials may be used in combination for forming the retardation film. For example, a mixture of two or more kinds of solid polymers having different functional groups, such as a mixture of polyaryl ether ketone and polyamide may be used. Particularly, a solid polymer of polyimide is more excellent than the conventional solid polymer of polycarbonate because the thickness of the retardation film can be reduced while the same effect can be kept.

Moreover, one kind or two or more kinds of suitable polymers other than the aforementioned polymers may be used additionally as long as the orientation of the solid polymer is not reduced remarkably. Incidentally, examples of the additional polymer include thermoplastic resins such as polyethylene, polypropylene, polystyrene, polymethyl methacrylate, ABS resin, AS resin, polyacetate, polycarbonate, polyamide, polyethylene terephthalate, polybutylene terephthalate, polyphenylene sulfide, polyether-sulfone, polyketone, polyimide, polycyclohexanedimethanol terephthalate, polyarylate, and liquid crystal polymer (inclusive of photopolymerizable liquid crystal monomer).

Examples of the additional polymer further include heat-curable resins such as an epoxy resin, a phenol resin, and a novolac resin. The amount of use of the additional polymer is not particularly limited if the orientation is not reduced remarkably. Generally, the amount of use of the additional polymer is not larger than 50% by weight, preferably not larger than 40% by weight, especially preferably not larger than 30% by weight.

The formation of a transparent film as a base of the retardation film can be performed in such a manner that a solid polymer is liquefied and spread and then the spread layer is solidified. For the formation of the transparent film, various additives such as a stabilizer, a plasticizer, metals, etc. may be mixed if necessary. A suitable method such as a method of heating the thermoplastic solid polymer to melt it, or a method of dissolving the solid polymer in a solvent to prepare a solution can be used for liquefying the solid polymer.

Accordingly, in the former melt solution, the solidification of the spread layer can be performed in such a manner that the spread layer is cooled. In the latter solution, the solidification of the spread layer can be performed in such a manner that the solvent is removed from the spread layer to dry the spread layer. One kind or two or more kinds of suitable methods such as a natural drying (air drying) method, a heat drying method, especially a heat drying method at 40 to 200° C., a suction drying method, etc. can be used for the drying. The method of applying a polymer solution is preferred from the point of view of production efficiency and suppression of optical anisotropy.

Examples of the solvent include: halogenated hydrocarbons such as chloroform, dichloromethane, carbon tetrachloride, dichloroethane, tetrachloroethane, trichloroethylene, tetrachloroethylene, chlorobenzene, and ortho-dichlorobenzene; phenols such as phenol, and para-chlorophenol; aromatic hydrocarbons such as benzene, toluene, xylene, methoxybenzene, and 1,2-dimethoxybenzene; ketones such as acetone, methylethyl ketone, methylisobutyl ketone, cyclohexanone, cyclopentanone, 2-pyrolidone, and N-methyl-2-pyrolidone; and esters such as ethyl acetate, and butyl acetate.

Examples of the solvent further include: alcohols such as t-butyl alcohol, glycerin, ethylene glycol, triethylene glycol, ethylene glycol monoethyl ether, diethylene glycol dimethyl ether, propylene glycol, dipropylene glycol, and 2-methyl-2, 4-pentandiol; amides such as dimethylformamide, and dimethylacetoamide; nitriles such as acetonitrile, and butyronitrile; ethers such as diethyl ether, dibutyl ether, and tetrahydrofuran; and others such as methylene chloride, carbon disulfide, ethylcellosolve, and butylcellosolve.

The solvent may be used singly or a suitable combination of two or more kinds of solvents may be used. The solution is prepared in such a manner that preferably 2 to 100 parts by weight of a solid polymer, more preferably 5 to 50 parts by weight of a solid polymer, especially preferably 10 to 40 parts by weight of a solid polymer are dissolved in 100 parts by weight of a solvent from the point of view of viscosity suitable for the formation of a film.

A suitable film-forming method such as a casting method or an extrusion method such as a spin coating method, a roll coating method, a flow coating method, a printing method, a dip coating method, a flow-out film-forming method, a bar coating method, a gravure printing method, etc. can be used for spreading the liquefied solid polymer. Especially, a solution film-forming method such as a casting method can be used preferably from the point of view of mass production of films little in thickness variation, orientation distortion variation, etc.

It is preferable from the point of view of achieving good contrast liquid crystal display in a wide viewing angle that the birefringent layer B has the relation nx>ny>nz in which nx is the maximum in-plane refractive index, ny is an in-plane refractive index in a direction perpendicular to the direction of nx, and nz is a thicknesswise refractive index. A retardation film having the birefringent layer B having the relation nx>ny>nz or a laminated film using the retardation film can be used particularly preferably in a VA mode or OCB mode liquid crystal display.

For example, the relation nx>ny>nz can be achieved by applying an extending process or/and a contracting process to a film. For example, the extending process can be performed as a stretching process etc. One kind or two or more kinds of suitable methods such as sequential type or simultaneous type biaxial stretching methods and free end type or fixed end type uniaxial stretching methods can be used for the stretching process. The temperature for the stretching process can be determined in conformity to the background art. Generally, the temperature is preferably near to the glass transition temperature of the solid polymer for forming the transparent film and more preferably not lower than the glass transition temperature and lower than the melting temperature.

On the other hand, for example, the contracting process can be performed by a method in which a transparent film is applied and formed on a base material so that size change caused by the temperature change of the base material etc. is used for making shrinking force act. In this case, a base material to which shrinkability of a heat-shrinkable film etc. is given can be used. In this case, it is preferable that a stretching machine or the like is used for controlling the rate of shrinkage.

The preferred method for producing the retardation film having the birefringent layer B is a method comprising the steps of: dissolving a solid polymer in a solvent to liquefy the solid polymer; spreading the liquefied polymer on a support film; drying the liquefied polymer to solidify the liquefied polymer; and orienting molecules in a plane by applying either or both of an extending process and a shrinking process to a transparent film or coating film made of the solidified polymer so that the characteristic nx>ny>nz is provided. According to this method, the transparent film can be processed in a state in which the transparent film is supported by the support film. This method is excellent in production efficiency, processing accuracy etc., so that continuous production can be achieved.

The retardation film may be formed from the transparent film integrated with the support film or may be formed from the transparent film separated from the support film. In the former case where the transparent film is integrated with the support film, a retardation generated in the support film by the stretching process or the like can be used as a retardation in the retardation film. This retardation film is a composite film. The latter case where the transparent film is separated from the support film is advantageous to the case where the retardation generated in the support film by the stretching process or the like is inconvenient. Incidentally, a film made of the aforementioned solid polymer may be also used as the support film in the composite film.

The polymer described in Japanese Patent Laid-Open No. 2001-343529 (WO 01/37007), for example, a resin composition containing (1) a thermoplastic resin having substitution or/and non-substitution imide groups in a side chain, and (2) a thermoplastic resin having substitution or/and non-substitution phenyl and nitrile groups in the chain side and including the aforementioned 1 and 2 can be used for forming the support film. Such a film can be used for supporting the optically uniaxial layer A made of the liquid crystal layer.

Incidentally, a specific example of the resin composition is a resin composition containing an isobutene-N-methyl maleimide crosslinked polymer and an acrylonitrile-styrene copolymer. The support film can be prepared as a film etc. made of a mixture extrudate of the resin composition etc. Incidentally, the polymer can be used for forming the transparent film.

The preferred retardation characteristic of the retardation film having a slow axis in the lengthwise direction from the point of view of the optically compensating effect or the like exhibits preferably Re of from 5 to 1,000 nm, more preferably Re of from 10 to 800 nm, especially preferably Re of 20 to 500 nm in $(nx-ny)d=\Delta n \cdot d=Re$ and $(nx-nz)d=Rz$ in which nx and ny are in-plane refractive indices, nz is a thicknesswise refractive index, and d is the thickness of the retardation film. Rz is preferably from 5 to 5,000 nm, more preferably from 10 to 3,000 nm, especially preferably from 30 to 1,000 nm.

The magnitudes of Re and Rz can be controlled in accordance with the kind of the polymer, the method of forming the spread layer such as the method of applying the liquefied polymer, the method of solidifying the spread layer such as the drying condition, the thickness of the film to be formed, the stretching condition, and so on.

In general, the thickness of the retardation film is preferably from 5 to 300 μm, more preferably from 10 to 200 μm, especially preferably from 20 to 150 μm. The thickness of the birefringent layer B provided as a coating film on the support film is preferably from 0.5 to 30 μm, more preferably from 1 to 25 μm, especially preferably from 2 to 20 μm in general.

For lamination of the polarizing film and the retardation film, the retardation film can be made to serve as a transparent protective layer in the polarizing film. In this case, the thickness of the laminated film and, accordingly, the thickness of the liquid crystal display or the like can be reduced.

For the formation of a laminated film, that is, for lamination of a polarizing film and one or two or more retardation films, an adhesive layer or a pressure-sensitive adhesive layer can be used if necessary. Such a laminated film can be preferably used for compensating the retardation caused by the birefringence of the cell for the purpose of widening the viewing angle of the liquid crystal cell, improving contrast, etc.

For practical use of the polarizing film or the laminated film, an adhesive layer or pressure-sensitive adhesive layer or adhesive layers or pressure-sensitive adhesive layers can be provided on a single surface or on both surfaces of another member such as a liquid crystal cell for the purpose of bonding the film to the other member such as the liquid crystal cell. For the formation of the pressure-sensitive adhesive layer, it is possible to use a transparent pressure-sensitive adhesive made of a suitable polymer such as an acrylic polymer, a silicone polymer, polyester, polyurethane, polyether, synthetic rubber, etc. Especially, an acrylic pressure-sensitive adhesive is preferred from the point of view of optical transparency, tackiness, weather resistance, etc.

Suitable additives such as natural and synthetic resins, fillers and pigments of glass fiber, glass beads, metal powder and another inorganic powder, colorants and antioxidants, etc. can be mixed with the pressure-sensitive adhesive layer if necessary. Transparent fine particles may be contained in the pressure-sensitive adhesive layer to provide the pressure-sensitive adhesive layer as a layer exhibiting light-diffusing characteristic. In the case where the pressure-sensitive adhesive later is exposed out of surface, it is preferable that a separator or the like is temporarily fixed to prevent the surface of the pressure-sensitive adhesive layer from contamination or the like until the tack adhesive layer is put into practical use.

Although the formation of the laminated film can be performed by a successively individual laminating method in a process of production of a liquid crystal display or the like, previous lamination has an advantage that efficiency in production of the liquid crystal display or the like can be improved by excellence in quality stability, laminating workability, etc.

The polarizing film or the laminated film according to the invention can be preferably used for forming various display devices such as a liquid crystal display. For application to such various display devices, one layer or two or more layers selected from other optical layers such as a reflection plate, a semi-transmissive reflection plate, a brightness enhancement film, another retardation plate, a diffusion control film, a polarizing and scattering film, etc. may be laminated through an adhesive layer or a pressure-sensitive adhesive layer to provide an optical member if necessary. Suitable bonding means such as the aforementioned pressure-sensitive adhesive layer can be used for the lamination.

The reflection plate is provided on the polarizing film for forming a reflective polarizing film. The reflective polarizing film is generally used for forming a liquid crystal display (reflective liquid crystal display) of the type in which the reflective polarizing film is disposed on the back side of a liquid crystal cell and reflects incident light from the viewing side (display side). The reflective polarizing film has an advantage that internal provision of a light source such as a backlight unit can be dispensed with to attain reduction in thickness of the liquid crystal display.

The formation of the reflective polarizing film can be performed by a suitable method such as a method of providing a reflection layer made of metal or the like on a single surface of the polarizing film through a transparent protective layer or the like if necessary. A specific example of the method is a method in which a sheet of foil or a vapor-deposition film made of a reflective metal such as aluminum is provided on a single surface of a transparent protective layer matted if necessary.

The reflection layer may be of a light-diffusing type. For example, the light-diffusing type reflection layer can be obtained by a method in which transparent fine particles are contained in a transparent protective layer to form a surface of the transparent protective layer as a fine roughness structure and in which a reflection layer is formed on the transparent protective layer so that the fine roughness structure is reflected on the transparent protective layer. The reflection layer having the surface of the fine roughness structure has an advantage that the reflection layer diffuses incident light by irregular reflection to prevent directivity and glaring appearance and suppress variation in brightness and darkness. The reflection layer on which the fine roughness structure is reflected can be formed in such a manner that a metal reflection layer is provided on the fine roughness structure by a suitable method such as a vapor deposition method or a plating method such as a vacuum vapor deposition method, an ion-plating method, a sputtering method, etc.

Incidentally, the reflection layer can be provided in the form of a reflection sheet or the like by a method of providing the reflection layer on a suitable film instead of the method of directly providing the reflection layer on the transparent protective layer of the polarizing film. The form of use of the reflection layer of metal having a reflection surface coated with a film, a polarizing film, etc. is preferred from the point of view of prevention of reduction in reflectance due to oxidation, long-term persistence of initial reflectance, avoidance of separate provision of a protective layer, and so on.

The reflection layer may be of a semi-transmissive type made of a half-mirror or the like and capable of reflecting light and transmitting light. The semi-transmissive polarizing film is also generally used for forming a display device of the type in which the semi-transmissive polarizing film is disposed on the back side of a liquid crystal cell so that incident light from the viewing side (display side) is reflected to achieve display when the liquid crystal display is used in a relatively bright atmosphere whereas a built-in light source such as a backlight unit disposed on the back side of the semi-transmissive polarizing film is used to achieve display when the liquid crystal display is used in a relatively dark atmosphere. Accordingly, the semi-transmissive polarizing film is useful for forming a display device of the type in which energy caused by use of the light source such as a backlight unit can be saved in the bright atmosphere whereas the built-in light source can be used in the relatively dark atmosphere.

On the other hand, the brightness enhancement film is used for suppressing absorption loss etc. due to the polarizing film to attain enhancement in luminance. A suitable film can be used as the brightness enhancement film. Incidentally, an example of the brightness enhancement film is a film (e.g. "D-BEF" manufactured by 3M) exhibiting characteristic of transmitting linearly polarized light with a predetermined axis of polarization but reflecting other light components, such as a multilayer thin film of dielectrics or a multilayer laminate of thin films different in refractive index anisotropy.

Another example of the brightness enhancement film is a film exhibiting characteristic of reflecting either of left-handed and right-handed circularly polarized light components but transmitting the other light components, such as a cholesteric liquid crystal layer, especially a cholesteric liquid crystal polymer-oriented film or the oriented liquid crystal layer supported on a film base (e.g. "PCF350" manufactured by NITTO DENKO CORP. or "Transmax" manufactured by MERCK & CO., INC.). The chlesteric liquid crystal type film may be used in combination with a quarter-wave plate in accordance with necessity for the purpose of converting circularly polarized light into linearly polarized light.

As the retardation plate, there may be used a plate exhibiting a suitable retardation, such as a stretched film of any kind of polymer by a suitable uniaxial or biaxial method, a polymer film oriented in the Z axis, a liquid crystal macromolecular layer, etc. besides the quarter-wave plate. The diffusion control film is used for controlling glaring, scattering light etc. concerned with the viewing angle and resolution. An optically functional film using diffusion, scattering or/and refraction is used as the diffusion control film. The polarizing and scattering film is provided as a film containing a scattering substance so that scattering anisotropy occurs in polarized light in accordance with the direction of vibration. The polarizing and scattering film is used for controlling polarized light.

Although the optical member provided as a laminate of two optical layers or three or more optical layers can be formed by a successively individually laminating method in a process of production of a liquid crystal display or the like, a previously laminated optical member has an advantage that efficiency in production of the liquid crystal display or the like can be improved because of excellence in quality stability, assembling workability, etc.

A pressure-sensitive adhesive layer or an adhesive layer for bonding the optical member to another member such as another optical layer or a liquid crystal cell can be provided on a necessary surface of the optical member. The adhesive layer can be formed in accordance with the above description. Especially, a pressure-sensitive adhesive layer low in hygroscopicity and excellent in heat resistance may be used preferably from the point of view of prevention of a foaming phenomenon and a peeling phenomenon due to hygroscopicity, reduction in optical characteristic and prevention of a warp of the liquid crystal cell due to the thermal expansion difference or the like, the formability of a display device excellent in quality and durability, and so on. Transparent fine particles may be mixed with the pressure-sensitive adhesive layer or the adhesive layer so that the pressure-sensitive adhesive layer or the adhesive layer can exhibit light-diffusing characteristic.

When the pressure-sensitive adhesive layer or the adhesive layer provided on the polarizing film, the laminated film or the optical member is exposed out of surface, it is preferable that the layer is temporarily covered with a separator for the purpose of anti-contamination or the like until the pressure-sensitive adhesive layer or the like is put into practical use. The separator can be obtained by a method in which a coating layer of a suitable releasant such as a silicone type releasant, a long-chain alkyl type releasant, a fluorine type releasant, molybdenum sulfide, etc. is provided on the support film or a suitable sheet of paper or the like if necessary.

The polarizing film, the retardation film or each of the layers such as the transparent protective layer, the pressure-sensitive adhesive layer, etc. for forming the laminated film, the optical member, etc. may be provided so that ultraviolet-absorbing power is given to the film or layer by a suitable method such as a method in which the film or layer is treated with an ultraviolet-absorbing agent such as a salicylic ester compound, a benzophenone compound, a benzotriazole compound, a cyanoacrylate compound, a nickel complex salt compound, etc.

EXAMPLES

The present invention is now illustrated in greater detail with reference to Examples and Comparative Examples, but it should be understood that the present invention is not to be construed as being limited thereto.

Incidentally, in the following description, a polarizer of a polarizing film stretched in an MD direction in a stretching step is referred to as "MD polarizer", and a polarizer of a polarizing film stretched in a TD direction is referred to as "TD polarizer". A retardation film stretched in the MD direction is referred to as "MD retardation film", and a retardation film stretched in the TD direction is referred to as "TD retardation film".

Example 1

A film was unrolled out successively from a roll of film made of polyvinyl alcohol (PVA) having the degree of polymerization of 2400 and having a thickness of 75 μm, a width of 0.3 m and a length of 500 m. The film was stretched by five times in the widthwise direction by a tenter stretching machine at 120° C. Then, the stretched film was immersed in a dye bath of a mixture of iodine and potassium iodine at 30° C. for 1 minute while shrinking in the lengthwise direction was suppressed. Then, the stretched film was immersed in an aqueous solution of 5% potassium iodide at 30° C. for 5 seconds. Then, the stretched film was dried at 45° C. for 7 minutes while fixed so that shrinking of the film was suppressed. The film obtained thus was cut by a width of 1 m.

Triacetyl cellulose (TAC) films were laminated on both surfaces of the film through PVA water-soluble adhesive agents. Thus, a TD polarizing film having a three-layer structure of TAC film/TD polarizer/TAC film was obtained and rolled up.

Comparative Example 1

A film was unrolled out successively from a roll of film made of PVA having the degree of polymerization of 2400 and having a thickness of 75 μm, a width of 1.2 m and a length of 500 m. The film was stretched by 2.5 times in the lengthwise direction by a roll type longitudinal stretching method while the film was immersed in pure water at 30° C. for 1 minute. Then, the stretched film was stretched by 1.2 times in the lengthwise direction while immersed in a dye bath of a mixture of iodine and potassium iodine at 30° C. for 1 minute. Then, the stretched film was stretched by twice in the lengthwise direction while immersed in a bath of an aqueous solution of 4% boric acid at 60° C. for 2 minutes. Then, the stretched film was immersed in an aqueous solution of 5% potassium iodide at 30° C. for 5 seconds. Then, the stretched film was dried at 45° C. for 7 minutes. The film obtained thus was cut by a width of 1 m. TAC films were stuck onto both surfaces of the film in the same manner as in Example 1. Thus, an MD polarizing film having a three-layer structure of TAC film/MD polarizer/TAC film was obtained and rolled up.

Referential Example 1

A film was unrolled out successively from a roll of film made of a norbornene resin film (ARTON manufactured by JSR CORP.) and having a thickness of 100 μm, a width of 1.2 m and a length of 500 m. The film was stretched by 1.3 times in the lengthwise direction by a roll type longitudinal stretching method at 170° C. Then, the stretched film was cut by a width of 1 m. Thus, an (MD) retardation film was obtained and rolled up. The film had Re of 100 nm. The Re distribution (variation: difference between a maximum value and a minimum value, this rule applies hereunder) in the widthwise direction was 5 nm. The slow axis distribution (in the lengthwise direction) was 1 degree.

Incidentally, Re (and Rz which will be described later) was calculated on the basis of refractive indices measured by KOBRA-21ADH manufactured by OJI SCIENTIFIC INSTRUMENTS. In the following description, refractive indices were measured in the same manner.

Referential Example 2

A (TD) retardation film was obtained in the same manner as in Referential example 1 except that an ARTON film was stretched by 1.5 times in the width direction by a tenter stretching machine at 175° C. The retardation film was rolled up. The film had Re of 100 nm. The Re distribution in the widthwise direction was 8 m. The slow axis distribution (in the widthwise direction) was 2.5 degrees.

Referential Example 3

A film was unrolled out successively from a roll of TAC film having a thickness of 50 μm, a width of 1.2 m and a length of 500 m. A cyclohexanone solution of 15% by weight if polyimide synthesized from 2,2'-bis(3,4-dicarboxyphenyl) hexafluoropropane and 2,2'-bis(trifluoromethyl)-4,4'-diaminobiphenyl was successively applied on the film and was dried at 120° C. for 10 minutes. Thus, a 6 μm-thick polyimide layer was formed on the film. The film was stretched by 1.05 times in the lengthwise direction by a roll type longitudinal stretching method at 150° C. Then, the stretched film was cut by a width of 1 m. Thus, an (MD) retardation film was obtained and rolled up. The film had Re of 50 nm and Rz of 280 nm. The Re distribution in the widthwise direction was 2 nm. The slow axis distribution (in the lengthwise direction) was 0.5 degrees.

Referential Example 4

A (TD) retardation film was obtained in the same manner as in Referential example 3 except that a film was stretched by 1.1 times in the widthwise direction by a tenter stretching machine at 150° C. The retardation film was rolled up. The film had Re of 50 nm and Rz of 290 nm. The Re distribution in the widthwise direction was 7 nm. The slow axis distribution (in the lengthwise direction) was 1.5 degrees.

Referential Example 5

A film was unrolled out successively from a roll of film made of a norbornene resin film (ZEONOA manufactured by ZEON CORP.) and having a thickness of 100 μm, a width of 1.3 m and a length of 1000 m. The film was stretched by 1.1 times in the lengthwise direction by a roll type longitudinal stretching method at 140° C. Then, the stretched film was cut by a width of 1 m. Thus, an (MD) retardation film was obtained and rolled up. The film had Re of 100 nm. The Re distribution in the widthwise direction was 4 nm. The slow axis distribution (in the lengthwise direction) was 1.6 degrees.

Referential Example 6

A film was unrolled out successively from a roll of film made of a polycarbonate resin film (PF film manufactured by KANEKA CORP.) and having a thickness of 100 μm, a width of 1.2 m and a length of 500 m. The film was stretched by 1.15 times in the lengthwise direction by a roll type longitudinal stretching method at 150° C. Then, the stretched film was cut by a width of 1 m. Thus, an (MD) retardation film was obtained and rolled up. The film had Re of 100 nm. The Re distribution in the widthwise direction was 5 nm. The slow axis distribution (in the lengthwise direction) was 1.8 degrees.

Referential Example 7

A film was unrolled out successively from a roll of film made of a cellulose acetate propionate resin film (KA film manufactured by KANEKA CORP.) and having a thickness of 100 μm, a width of 1.2 m and a length of 500 m. The film was stretched by 1.5 times in the lengthwise direction by a roll type longitudinal stretching method at 150° C. Then, the stretched film was cut by a width of 1 m. Thus, an (MD) retardation film was obtained and rolled up. The film had Re of 100 nm. The Re distribution in the widthwise direction was 5 nm. The slow axis distribution (in the lengthwise direction) was 1.2 degrees.

Example 2

While a (TD) polarizing film obtained in Example 1 and an (MD) retardation film obtained in Referential example 1 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was perpendicular to the slow axis of the retardation film was obtained continuously.

Example 3

While a (TD) polarizing film obtained in Example 1 and an (MD) retardation film obtained in Referential example 3 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was perpendicular to the slow axis of the retardation film was obtained continuously.

Example 4

While a (TD) polarizing film obtained in Example 1 and an (MD) retardation film obtained in Referential example 5 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was perpendicular to the slow axis of the retardation film was obtained continuously.

Example 5

While a (TD) polarizing film obtained in Example 1 and an (MD) retardation film obtained in Referential example 6 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was perpendicular to the slow axis of the retardation film was obtained continuously.

Example 6

While a (TD) polarizing film obtained in Example 1 and an (MD) retardation film obtained in Referential example 7 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was perpendicular to the slow axis of the retardation film was obtained continuously.

Comparative Example 2

While an (MD) polarizing film obtained in Comparative Example 1 and a (TD) retardation film obtained in Referential example 2 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was perpendicular to the slow axis of the retardation film was obtained continuously.

Comparative Example 3

While an (MD) polarizing film obtained in Comparative Example 1 and a (TD) retardation film obtained in Referential example 4 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was perpendicular to the slow axis of the retardation film was obtained continuously.

Comparative Example 4

An (MD) polarizing film obtained in Comparative Example 1 and an (MD) retardation film obtained in Referential example 1 were cut into films with a predetermined size. The films were laminated through an acrylic pressure-sensitive adhesive layer while the absorption axis of the polarizing film was perpendicular to the slow axis of the retardation film. Thus, a laminated film was obtained.

Comparative Example 5

While an (MD) polarizing film obtained in Comparative Example 1 and an (MD) retardation film obtained in Referential example 5 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was parallel to the slow axis of the retardation film was obtained continuously.

Comparative Example 6

While an (MD) polarizing film obtained in Comparative Example 1 and an (MD) retardation film obtained in Referential example 6 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was parallel to the slow axis of the retardation film was obtained continuously.

Comparative Example 7

While an (MD) polarizing film obtained in Comparative Example 1 and an (MD) retardation film obtained in Referential example 7 were unrolled out successively from rolls of film respectively, the films were laminated through an acrylic pressure-sensitive adhesive layer so that the lengthwise directions of the films were made to correspond to each other. Thus, a laminated film in which the absorption axis of the polarizing film was parallel to the slow axis of the retardation film was obtained continuously.

Evaluation Test 1

Laminated films obtained in Examples and Comparative Examples and each having an effective width of 1 m were used in the following combinations to obtain Samples 1 to 5. The maximum size of a screen allowed to be formed in the case where the laminated films were disposed on the viewing side and back side of a VA type liquid crystal cell having a 16:9 aspect ratio so that the absorption axes of polarizing films were perpendicular to each other was examined while these samples were used. Results of the examination were shown in Table 1.

TABLE 1

|  | Laminated film | | Maximum Screen |
| --- | --- | --- | --- |
|  | Viewing Side | Back Side | Size |
| Sample 1 | Comparative Example 2 | Example 2 | 80 inches |
| Sample 2 | Comparative Example 3 | Example 3 | 80 inches |
| Sample 3 | Comparative Example 2 | Comparative Example 2 | 45 inches |
| Sample 4 | Comparative Example 3 | Comparative Example 3 | 45 inches |
| Sample 5 | Comparative Example 2 | Comparative Example 4 | 45 inches |

Evaluation Test 2

A laminated film obtained in each of Examples and Comparative Examples and having a predetermined size was disposed on the back side of a VA type liquid crystal cell available on the market while a polarizing film obtained in Example 1 was disposed on the viewing side so that the absorption axis of the polarizing film was perpendicular to that on the back side. Thus, a liquid crystal display was formed. In this manner, the following liquid crystal display Samples 6 to 15 were obtained. The visibility of display of each of the liquid crystal displays was examined. Results of the examination were shown in Table 2.

TABLE 2

|  | Laminated film | Visibility |
| --- | --- | --- |
| Sample 6 | Example 2 | Good |
| Sample 7 | Example 3 | Good |
| Sample 8 | Comparative Example 2 | Ununiform |
| Sample 9 | Comparative Example 3 | Ununiform |
| Sample 10 | Example 4 | Good |
| Sample 11 | Example 5 | Good |
| Sample 12 | Example 6 | Good |
| Sample 13 | Comparative Example 5 | Ununiform |
| Sample 14 | Comparative Example 6 | Ununiform |
| Sample 15 | Comparative Example 7 | Ununiform |

It is apparent from the Samples 1 to 5 that the screen size can be increased when the laminated film (Samples 1 and 2) using the polarizing film according to the invention is used. It is apparent from the Samples 6 to 12 that the laminated film (Samples 6, 7 and 10 to 12) according to the invention can achieve good display because variation in the slow axis of the retardation film is few. It is apparent from the Samples 10 to 15 that good display can be achieved when the absorption axis of the polarizing film and the slow axis of the retardation film are made to be perpendicular to each other as in the laminated film (Samples 10 to 12) according to the invention.

According to the invention, a long polarizing film having an absorption axis in the widthwise direction can be obtained. The length in the lengthwise direction, that is, the transverse size can be set at option. When the polarizing film is combined with a long polarizing film having an absorption axis in the lengthwise direction, the orthogonal relation between the absorption axes in the front and rear surfaces of a liquid crystal cell can be formed in accordance with the screen of an arbitrary transverse size. A large-size screen of liquid crystal display can be achieved. Widening of the width can be also achieved by stretching in the widthwise direction. Incidentally, when long polarizing films each having a width of 1200 mm are used in the aforementioned combination, a liquid crystal screen of maximum 95 inches in 16:9 aspect ratio can be formed.

Furthermore, when the long polarizing film is combined with a long retardation film having a slow axis in the lengthwise direction, the orthogonal relation between the absorption axis of the polarizing film and the slow axis of the retardation film can be formed by such lamination that the lengthwise directions of the long films are made to correspond to each other, since being a long polarizing film having an absorption axis in the widthwise direction. A laminated film made of the laminate can be produced efficiently in a laminating process in which the long films rolled up are unrolled out successively.

Because a film stretched in the lengthwise direction can be used as a retardation film, variation in the direction of the slow axis due to the boing phenomenon hardly occurs so that excellent axial accuracy can be obtained. There can be obtained a laminated film in which the retardation in a liquid crystal cell can be optically compensated with high accuracy to achieve uniform liquid crystal display and attain widening of the viewing angle.

While the present invention has been described in detail and with reference to specific embodiments thereof, it will be apparent to one skilled in the art that various changes and modifications can be made therein without departing from the spirit and scope thereof.

The present application is based on Japanese Patent Application Nos. 2003-289612 filed on Aug. 8, 2003 and 2004-215159 filed on Jul. 23, 2004, and the contents thereof are incorporated herein by reference.

INDUSTRIAL APPLICABILITY

The polarizing film, the laminated film and the optical member according to the invention can be preferably used for forming various devices such as liquid crystal displays. For example, the polarizing film, the laminated film and the optical member according to the invention can be used for forming liquid crystal displays such as a reflective liquid crystal display, a semi-transmissive liquid crystal display or a transmissive-reflective double type liquid crystal display in which a polarizing film is disposed on a single surface of a liquid crystal cell or polarizing films are disposed on both surfaces of a liquid crystal cell.

That is, though a liquid crystal display is generally formed by suitably assembling constituent parts such as a liquid crystal cell, a polarizing film or laminated film and an illumination system in accordance with necessity and incorporating a driving circuit therein, there is no particular limitation in the invention except that the polarizing film, laminated film or optical member according to the invention is provided on at least one outer surface of a liquid crystal cell. The invention can comply with the background art. When films are disposed on both surfaces of a liquid crystal cell, use of a combination of a polarizing film having an absorption axis in the widthwise direction and a polarizing film having an absorption axis in the lengthwise direction is advantageous from the point of view of the formability of a large-size screen.

Accordingly, it is possible to form a suitable liquid crystal display such as a liquid crystal display having one laminated film or two laminated films disposed on a single surface or both surfaces of a liquid crystal cell, a liquid crystal display using a backlight unit or a front light unit as an illumination system or a transmissive, reflective or transmissive-reflective double type liquid crystal display using a reflection plate or a semi-transmissive reflection plate. It is more preferable from the point of view of the compensating effect or the like that the laminated film is disposed so that the retardation film of the laminated film is located between the liquid crystal cell on the viewing side or/and back side and the polarizing film, especially between the liquid crystal cell and the viewing side polarizing film. For the arrangement of the laminated film, the film provided in the form of the optical member may be used.

The liquid crystal cell for forming the liquid crystal display in the above description can be selected at option. For example, a suitable type liquid crystal cell such as an active matrix driving type liquid crystal cell represented by a thin-film transistor liquid crystal cell, a passive matrix driving type liquid crystal cell represented by a TN or STN liquid crystal cell, a VA liquid crystal cell, an OCB liquid crystal cell, an IPS liquid crystal cell, etc. may be used. Especially, a liquid crystal cell of the type in which the polarizing film is disposed so that the absorption axis of the polarizing film becomes parallel to a side of the liquid crystal cell, such as a VA liquid crystal cell or an IPS liquid crystal cell may be used preferably.

In the above description, parts for forming the liquid crystal display may be laminated integrally or may be separated. For the formation of the liquid crystal display, suitable optical elements such as a prism array sheet, a lens array sheet, a light-diffusing plate, a protective plate, etc. can be disposed suitably. Such elements may be laminated on the laminated film so as to be provided in the form of the optical member for forming the liquid crystal display.

What is claimed is:

1. A method for producing a laminated film comprising the continuous roll to roll production steps of:

providing a polarizing film comprising a first long polymer film and having an absorption axis in a TD direction of the first long polymer film, the TD direction being the transverse direction;

providing a uniaxially stretched retardation film comprising a second long polymer film and having a slow axis in an MD direction of the second long polymer film, the MD direction being the machine direction, each of the first long polymer film and the second long polymer film having a length not smaller than 5 times as long as a width thereof, wherein nx>ny>nz in the retardation film, where nx and ny are in-plane refractive indices, and nz is a thickness-wise refractive index; and laminating the polarizing film on the retardation film by adhering the polarizing film to the retardation film with an adhesive layer so that an MD direction of the first long polymer film corresponds to the MD direction of the second long polymer film, wherein the step of providing the polarizing film includes:

stretching the first long polymer film in the TD direction thereof; and dyeing the first polymer film with a dichroic substance, wherein the retardation film has a slow axis distribution in the lengthwise direction in the range of 0.5 degree to 1.8 degree.

2. The method according to claim 1, wherein each of the first long polymer film and the second long polymer film has a width in the range of 5 mm to 5 m.

3. The method according to claim 1, wherein the retardation film comprises a non-liquid crystalline material.

4. The method according to claim 3, wherein the non-liquid crystalline material is selected from the group consisting of polyetherketon, polyamide, polyester, polyimide, polyamideimide, and polyesterimide.

* * * * *